US012680232B2

(12) United States Patent
Backfolk et al.

(10) Patent No.: US 12,680,232 B2
(45) Date of Patent: *Jul. 14, 2026

(54) METHOD FOR MANUFACTURING A BARRIER FILM, AND A BARRIER FILM

(71) Applicant: Stora Enso OYJ, Helsinki (FI)

(72) Inventors: Kaj Backfolk, Lappeenranta (FI); Isto Heiskanen, Imatra (FI); Matthias Krätschell, Berlin (DE); Cecilia Land Hensdal, Forshaga (SE)

(73) Assignee: Stora Enso OYJ, Helsinki (FI)

( * ) Notice: Subject to any disclaimer, the term of this patent is extended or adjusted under 35 U.S.C. 154(b) by 111 days.

This patent is subject to a terminal disclaimer.

(21) Appl. No.: 18/555,328

(22) PCT Filed: Apr. 13, 2022

(86) PCT No.: PCT/IB2022/053481

§ 371 (c)(1),
(2) Date: Oct. 13, 2023

(87) PCT Pub. No.: WO2022/219560

PCT Pub. Date: Oct. 20, 2022

(65) Prior Publication Data

US 2024/0191435 A1      Jun. 13, 2024

(30) Foreign Application Priority Data

Apr. 16, 2021    (WO) .................. PCT/IB2021/053153

(51) Int. Cl.
| | |
|---|---|
| *D21H 19/12* | (2006.01) |
| *B29C 43/24* | (2006.01) |
| *D21H 11/18* | (2006.01) |
| *D21H 19/20* | (2006.01) |
| *D21H 19/34* | (2006.01) |
| *D21H 19/72* | (2006.01) |
| *D21H 19/82* | (2006.01) |
| *D21H 25/06* | (2006.01) |
| *B29K 1/00* | (2006.01) |
| *D21H 27/10* | (2006.01) |

(52) U.S. Cl.
CPC ............. *D21H 19/12* (2013.01); *B29C 43/24* (2013.01); *D21H 11/18* (2013.01); *D21H 19/20* (2013.01); *D21H 19/34* (2013.01); *D21H 19/72* (2013.01); *D21H 19/82* (2013.01); *D21H 25/06* (2013.01); *B29K 2001/00* (2013.01); *B29K 2995/0069* (2013.01); *B29K 2995/0077* (2013.01); *B29K 2995/0097* (2013.01); *D21H 27/10* (2013.01)

(58) Field of Classification Search
CPC ........ D21H 19/12; D21H 11/18; D21H 19/72; D21H 25/06; D21H 19/20; D21H 19/34; D21H 19/82; D21H 27/10
See application file for complete search history.

(56) References Cited

U.S. PATENT DOCUMENTS

| | | | | |
|---|---|---|---|---|
| 5,554,288 | A * | 9/1996 | Rydell | ............... B01J 20/28088 |
| | | | | 210/473 |
| 11,192,987 | B2 | 12/2021 | Backfolk et al. | |
| 2004/0180184 | A1* | 9/2004 | Fillion | ................... D21H 11/10 |
| | | | | 428/211.1 |
| 2013/0029106 | A1* | 1/2013 | Lee | ........................ D21H 27/40 |
| | | | | 162/146 |
| 2023/0416992 | A1* | 12/2023 | Heiskanen | ............. D21H 23/50 |
| 2024/0209573 | A1* | 6/2024 | Backfolk | ............... D21H 25/06 |

FOREIGN PATENT DOCUMENTS

| | | | | | |
|---|---|---|---|---|---|
| DE | 202016008870 | U1 * | 4/2020 | ............. | B65D 65/42 |
| JP | 2003154609 | A | 5/2003 | | |
| JP | 2014196571 | A | 10/2014 | | |
| JP | 2018104835 | A | 7/2018 | | |
| JP | 2020509255 | A | 3/2020 | | |
| SE | 545321 | C2 * | 7/2023 | ............. | D21H 21/18 |
| WO | WO-03078731 | A2 * | 9/2003 | ............. | D21H 11/10 |
| WO | 2017046749 | A1 | 3/2017 | | |
| WO | 2018158676 | A1 | 9/2018 | | |

(Continued)

OTHER PUBLICATIONS

English Machine translation DE202016008870U1, 2020. (Year: 2020).*
International Search Report from corresponding PCT/IB2022/053481, mailed May 17, 2022.
Extended European Search Report from corresponding European application No. 22787739.6 dated Jan. 29, 2025.

(Continued)

*Primary Examiner* — Anthony Calandra

(74) *Attorney, Agent, or Firm* — Greer, Burns & Crain, Ltd.

(57) ABSTRACT

The present invention relates to a process for manufacturing a barrier film, wherein the method comprises: —providing an aqueous suspension comprising at least 70 weight-% highly refined cellulose pulp having an SR value of 70-95 and having a content of fibers having a length>0.2 mm of at least 10 million fibers per gram based on dry weight: —forming a wet web; —dewatering and/or drying to form a substrate; —calendering said substrate in at least a first calender nip and a second calender nip; —providing said substrate with at least one first layer of a barrier chemical to form a coated substrate, wherein each first layer has a coat weight of 0.5-5 gsm, and wherein a total coat weight on of the first layers is ≤8 gsm, and—drying to form said barrier film having a thickness of <50 μm. The invention relates also to a barrier film, a barrier film laminate with a polymer layer and a packaging material comprising the barrier film.

22 Claims, No Drawings

(56)        References Cited

FOREIGN PATENT DOCUMENTS

| WO | 2018211441 | A1 | 11/2018 |
|----|------------|-----|---------|
| WO | 2019198040 | A1 | 10/2019 |
| WO | 2019229759 | A1 | 12/2019 |
| WO | 2020110013 | A1 | 6/2020 |
| WO | 2020261170 | A1 | 12/2020 |
| WO | 2021001751 | A1 | 1/2021 |

OTHER PUBLICATIONS

Kjellgren et al., Barrier properties of greaseproof paper, Diss Institutionen for kemi, Jan. 1, 2005, XP055640832, URL:/https://www.diva-portal.org/smash/get/diva2:5289/FULLTEXT01.pdf.

* cited by examiner

METHOD FOR MANUFACTURING A BARRIER FILM, AND A BARRIER FILM

This application is a U.S. National Phase under 35 U.S.C. § 371 of International Application No. PCT/IB2022/053481, filed Apr. 13, 2022, which claims priority under 35 U.S.C. §§ 119 and 365 to International Application No. PCT/IB2021/053153 filed Apr. 16, 2021.

TECHNICAL FIELD

The present disclosure relates to a method for manufacturing a barrier film, which has good barrier properties, such as water vapor barrier properties, is thin, has a low coat weight, is sustainable and recyclable and has improved properties suitable for vacuum deposition coating. Furthermore, the present disclosure relates to a method for manufacturing a barrier film laminate comprising the barrier film with a vacuum coating layer. In addition, the present disclosure relates to a barrier film, a barrier film laminate, and a paper or paperboard based packaging material comprising the barrier film or the barrier film laminate. The barrier film and the barrier film laminate may be used in, for example, paper or paperboard based packaging materials.

BACKGROUND

Barrier films comprising cellulose fibers or polymers (cellulose-based barrier films), including films comprising high amounts of highly refined cellulose, nanocellulose or microfibrillated cellulose (MFC), are known in the art. Depending on how they are produced the cellulose-based barrier films may have particularly advantageous strength and/or barrier properties, whilst being biodegradable and recyclable (or repulpable). Such barrier films may be used in, for example, the manufacture of packaging materials and may be laminated or otherwise provided on the surface of paper or paperboard materials. Use of cellulose-based barrier films in packaging materials facilitate re-pulping and re-cycling of the used packaging materials.

However, the barrier properties of cellulose-based barrier films may be sensitive to moisture or (higher) relative humidity. In particular, the gas barrier properties of such barrier films tend to deteriorate at high temperatures and high humidity, such as when exposed to tropical conditions or conditions allowing condensation.

Many approaches for improving the barrier properties towards oxygen, air, water vapour and aromas at high relative humidity have been investigated and described, but most of the suggested solutions are expensive and difficult to implement on an industrial scale.

For example, various chemical solutions, such as coatings, lamination and surface-treatments, have been tested for improving the gas barrier properties of cellulose-based barrier films at high relative humidity. One common problem of many of these solutions is that they also reduce the sustainability and reusability of the materials.

However, difficulties may arise when providing coatings and surface treatments on cellulose-based substrates. The barrier chemicals applied as coatings on cellulose-based substrates are usually water-based solutions, dispersion or emulsions. When such water-based solutions, dispersions or emulsions are applied onto a thin cellulose-based web or substrate, the web may break or problems with dimensional stability (expansion when wetted or shrinkage when dried) may occur. This is due to water sorption and penetration into the hydrophilic substrate, affecting the hydrogen bonds between the fibrils, fibers, and the additives. Thus, web tension control may be difficult in the machine direction. Also, the web handling in the cross machine direction may be difficult.

One solution is to increase the solids of the applied solutions or dispersions, although this often leads to higher coat weight and higher viscosity of the solution. High viscosity, on the other hand, generates higher stresses on the substrates and often higher coat weights.

Another solution is to increase the basis weight of the cellulose-based web or substrate, since a higher basis weight implies a stronger material due to more fiber-fiber bonds. However, higher grammage means higher cost, a need of higher drying capacity, slower drainage (web forming) and larger reel diameter (less meter per reel when converting). Higher grammage could lead to rougher surface and/or formation of pinholes.

A further solution to reduce water sensitivity of the web is to enhance the hydrophobicity of the web by adding hydrophobizing agents to the furnish. Addition of hydrophobizing agents, might on the other hand, influence the barrier properties and might cause problems when further converting, especially if converting at high temperatures.

There are also mechanical solutions to handle the expansion/shrinkage problems, such as use of spreading rolls or shorter time between coating and drying.

For these reasons, controlling barrier chemical-substrate interaction and subsequently providing sufficient barrier properties is difficult, especially at a low coat weight and for thin substrates.

Therefore, aluminum foil and/or film-forming polymers such as thermoplastic polymers is used for these purposes and generally provides sufficient properties with regard to penetration or diffusion of oil or greases and/or aromas or gas, such as oxygen. The aluminum or certain film-forming polymers might also provide an enhanced water vapor barrier, which is important to barrier and package functionality in high relative humidity conditions or to reduce evaporation of packed liquid products.

However, one issue with the use of aluminum foil and certain film-forming polymers such as PVDC is that they pose an environmental challenge, may be a problem in the recycling process and, depending on the amount used, may lead to the material not being compostable. It is therefore desirable to use as small amount of aluminum as possible. However, at the same time it is essential to maintain the barrier properties of the packaging material.

It is known in the art to provide vacuum deposition coatings, which are very thin, such as from about 0.1 nm to about 500 nm in thickness. For example, vacuum deposition coating may form metallized surfaces using a very small amount of metal or metal oxides, such as aluminum or $TiO_2$, $Al_2O_3$, MgO, ZnO, $AlO_x$ or $SiO_x$. For example, atomic layer deposition (ALD), dynamic compound deposition (DCD), chemical vapor deposition (CVD), such as plasma CVD, and physical vapor deposition (PVD) are techniques suitable to provide a small amount of metal on a surface. However, it remains essential that the cellulose-based barrier films, when provided with a vacuum deposition coating such as being metallized, can maintain barrier properties and are sufficiently crack-resistant.

Thus, there is still room for improvements of methods for producing cellulose-based barrier films, e.g. for paper or paperboard based packaging materials, which have good barrier properties such as water vapour barrier properties and which are suitable to use for vacuum deposition coating.

DESCRIPTION OF THE INVENTION

It is an object of the present invention to provide an improved method for manufacturing a barrier film, e.g. for a paper or paperboard based packaging material, which barrier film has good barrier properties, such as water vapor barrier properties, which method eliminates or alleviates at least some of the disadvantages of the prior art methods.

It is a further object of the present invention to provide a method for manufacturing a barrier film, which has good barrier properties, in particular water vapour barrier properties, is thin, has a low coat weight and has good mechanical properties, such as tensile properties, being suitable for vacuum deposition coating.

The above-mentioned objects, as well as other objects as will be realized by the skilled person in the light of the present disclosure, are achieved by the various aspects of the present disclosure.

According to a first aspect illustrated herein, there is provided a method for manufacturing a barrier film, comprising the steps of:

providing an aqueous suspension comprising at least 70 weight-% highly refined cellulose pulp based on total dry weight of the aqueous suspension, wherein said highly refined cellulose pulp has a Schopper-Riegler value of 70-95° SR, and wherein said highly refined cellulose pulp has a content of fibers having a length>0.2 mm of at least 10 million fibers per gram based on dry weight;

forming a wet web from said aqueous suspension;

dewatering and/or drying said wet web to form a substrate having a first side and an opposite second side;

calendering said substrate in at least a first calender nip in a first calendering step and a second calender nip in a second calendering step, wherein said substrate has a moisture content of 1-25 weight-% when entering said first calender nip;

providing said substrate with at least one first layer of a) a water-based solution or dispersion comprising a polymer selected from the group consisting of: a polyvinyl alcohol, a modified polyvinyl alcohol, a polysaccharide or a modified polysaccharide, or combinations thereof, on said first side in a first coating step to form a coated substrate, wherein each first layer has a coat weight of 0.5-5 gsm, preferably 0.5-3 gsm, calculated as dry weight, and wherein a total coat weight on the first side is equal to or less than 8 gsm calculated as dry weight, and drying said coated substrate after said calendering and said first coating step so as to form said barrier film, wherein said barrier film has a thickness of less than 50 μm, preferably less than 45 μm, most preferably less than 40 μm.

It has surprisingly been found that by using at least 70 weight-% of the herein specified highly refined cellulose pulp, based on total dry weight of the aqueous suspension, for forming a substrate and by calendering the substrate in at least a first calender nip and a second calender nip, wherein the substrate has a moisture content of 1-25 weight-% when entering the first calender nip, it is possible to provide the substrate with a low coat weight on at least one side when using a water-based solution or dispersion of a barrier chemical selected from group a) above and obtain a thin barrier film with good barrier properties, in particular water vapour barrier properties, on at least one side and with good mechanical properties, such as tensile properties, for with-standing vacuum deposition coating.

When water-based solutions, dispersions or emulsions are applied onto a thin cellulose-based web or substrate, the web may break or problems with dimensional stability (expansion when wetted or shrinkage when dried) may occur. This is due to water sorption and penetration into the hydrophilic substrate, affecting the hydrogen bonds between the fibrils, fibers, and the additives. Thus, web tension control may be difficult in the machine direction. Also, the web handling in the cross machine direction may be difficult. One previously known solution is to increase solids of the applied solutions, although this often leads to higher coat weight and higher viscosity of the solution. High viscosity, on the other hand, generates higher stresses on the substrates and often higher coat weights. Another previously known solution is to increase the basis weight of the cellulose-based web or substrate, since a higher basis weight implies a stronger material due to more fiber-fiber bonds. However, higher bulk means increased roughness and larger reel diameter (less meter per reel when converting).

Thus, it has surprisingly been found that by using at least 70 weight-% of the herein specified highly refined cellulose pulp, based on total dry weight of the aqueous suspension, for forming a substrate and by calendering the substrate in at least a first calender nip and a second calender nip, wherein the substrate has a moisture content of 1-25 weight-% when entering the first calender nip, it is enabled to avoid using a high amount of coating and/or to avoid using a high viscosity (where high viscosity means >5000 mPas at 23° C., e.g. as measured with a Brookfield rotational viscosimeter) of the applied barrier chemical solution/dispersion when using a barrier chemical selected from group a) above and/or to avoid increasing the basis weight of the substrate in order to obtain a thin barrier film with good barrier properties, in particular water vapour barrier properties, and with good mechanical properties, such as tensile properties. Use of special or complex mechanical solutions to reduce the problems with web breaks and problems with dimensional stability may also be avoided or limited. Further advantages are that better coating hold-out and less penetration into the web may be achieved.

The term barrier film as used herein generally refers to a thin continuous sheet formed material with low permeability for gases and/or liquids. Depending on the composition of the pulp suspension, the film can also be considered as a thin paper or even as a membrane, e.g. for selective control of flux of components or gases.

The barrier film can be used as such, or it can be combined with one or more other layers. The film is for example useful as a barrier layer in a paper or paperboard based packaging material. The barrier film may also be or constitute a barrier layer in a multiply product comprising a base such as glassine, greaseproof paper, barrier paper or bioplastic films. Alternatively, the barrier film can be comprised in at least one layer in a multiply sheet such as a liquid packaging board.

The term barrier chemical as used herein refers to a chemical applied as coating or surface treatment to a substrate for improving at least one barrier property, e.g. water vapour barrier property.

Paper generally refers to a material manufactured in thin sheets from the pulp of wood or other fibrous substances comprising cellulose fibers, used for writing, drawing, or printing on, or as packaging material.

Paperboard generally refers to strong, thick paper or cardboard comprising cellulose fibers used for boxes and other types of packaging. Paperboard can either be bleached or unbleached, coated or uncoated, and produced in a variety of thicknesses, depending on the end use requirements.

A paper or paperboard-based packaging material is a single or multiply packaging material formed mainly, or entirely from paper or paperboard. In addition to paper or paperboard, the paper or paperboard-based packaging material may comprise additional layers or coatings designed to improve the performance and/or appearance of the packaging material.

As mentioned above, the method of the first aspect of the present disclosure comprises a step of providing an aqueous suspension comprising at least 70 weight-% highly refined cellulose pulp based on total dry weight. Refining, or beating, of cellulose pulps refers to mechanical treatment and modification of the cellulose fibers in order to provide them with desired properties.

The highly refined cellulose pulp used in the method of the first aspect has a Schopper Riegler value (°SR) of 70-95, preferably in the range of 70-92, more preferably in the range of 75-92, most preferably in the range of 75-90 or 80-90 or 85-90, as determined by standard ISO 5267-1. The SR value is determined for a pulp without additional chemicals, thus the fibers have not consolidated into a film or started e.g. hornification.

In addition, the highly refined cellulose pulp used in the method of the first aspect has a content of fibers having a length>0.2 mm of at least 10 million fibers per gram based on dry weight, preferably at least 12 million fibers per gram based on dry weight, more preferably at least 15 million fibers per gram based on dry weight, even more preferably at least 17 million fibers per gram based on dry weight. The content of fibers having a length>0.2 mm may for example be determined using the L&W Fiber tester Plus instrument (L&W/ABB), (also referred herein to as "Fiber Tester Plus"). For example, fibers may be defined as fibrous particles longer than 0.2 mm according to standard ISO 16065-2.

Furthermore, in some embodiments, the highly refined cellulose pulp used in the method of the first aspect of the present disclosure has a mean fibril area of fibers having a length>0.2 mm of at least 15%, preferably at least 17%, more preferably at least 20%. The mean fibril area is determined using the L&W Fiber Tester Plus (L&W/ABB) instrument, e.g. with definition of fibers as fibrous particles longer than 0.2 mm according to standard ISO 16065-2. "Mean fibril area" as used herein refers to length weighted mean fibril area.

In some embodiments, the highly refined celluose pulp used in the method of the first aspect has a water retention (WRV) value of ≥250%, more preferably ≥300%. In addition, the WRV value is preferably ≤400%, more preferably ≤380% or ≤370% or ≤350%. In some embodiments, the highly refined cellulose pulp used in the method of the first aspect has a WRV value of 250-400%, or 250-380%, or 250-350%, or 300-350%. The WRV value may be determined by standard ISO 23714 with the use of a 200 mesh wire.

The highly refined cellulose pulp used in the method of the first aspect can be produced in many different ways using methods known in the art to achieve the desired Schopper-Riegler value and content of fibers having a length>0.2 mm and optionally the desired mean fibril area and WRV value.

As mentioned above, the aqueous suspension used in the method of the first aspect comprises at least 70 weight-%, more preferably at least 75 weight-%, most preferably at least 80 weight-%, at least 85 weight-% or at least 90 weight-% of highly refined cellulose pulp based on total dry weight of the aqueous suspension. In some embodiments, the aqueous suspension comprises highly refined cellulose pulp in the range of 70-99 weight-%, more preferably in the range of 75-99 weight-%, most preferably in the range of 80-99 weight-% or 85-99 weight-% or 90-99 weight-%, based on the total dry weight of the aqueous suspension.

In some embodiments, the aqueous suspension further comprises one or more further cellulose pulp fractions in addition to the highly refined cellulose pulp, which one or more further cellulose pulp fractions have been refined to different refining degrees than the highly refined cellulose pulp or have been co-refined with the highly refined cellulose pulp. In some embodiments, the aqueous suspension comprises a further cellulose pulp fraction of moderately refined cellulose pulp having a Schopper-Riegler value of ≤50° SR, such as 15-50° SR or 20-40° SR, as determined by standard ISO 5267-1, and/or a further fraction of normal fibers. The aqueous suspension may comprise, for example, 1-30 weight-%, more preferably 2-30 weight-%, most preferably 5-30 weight-%, of further cellulose pulp fractions, based on the total dry weight of highly refined cellulose pulp and further cellulose pulp fraction(s) (i.e. based on the total dry weight of total amount of fibers in the aqueous suspension).

By normal fibers is meant normal pulp fibers of a conventional length and fibrillation for papermaking. Normal fibers may include mechanical pulp, thermochemical pulp, chemical pulp such as sulphate (kraft) or sulphite pulp, dissolving pulp, recycled fiber, organosolv pulp, chemi-thermomechanical pulp (CTMP), or combinations thereof. Normal fibers may alternatively or additionally include semichemical pulp. The pulp may be bleached or unbleached. The normal fibers can be vegetable fibers, such as wood derived (e.g. hardwood or softwood) or agricultural sources including straw, bamboo, etc.

The normal fibers may have a beating degree, i.e. Schopper-Riegler value, in the range of 15 to 50° SR or more preferably in the range of 18 to 40° SR, as determined by standard ISO 5267-1. The normal fibers may preferably be chemical pulp, such as kraft pulp.

The normal fibers may have an average length in the suspension of 1 mm to 5 mm, more preferably in the range of 2 to 4 mm.

The highly refined cellulose pulp and the optional moderately refined cellulose pulp used in the method of the first aspect may for example be produced from softwood or hardwood or a mix thereof, such as 5-95, 10-90, 15-95, 20-80 or 25-75 (weight-% softwood-weight-% hardwood). It can also be made from microbial sources, agricultural fibers such as wheat straw pulp, bamboo, bagasse, or other non-wood fiber sources. It can also be made from broke or recycled paper. For example, the highly refined cellulose pulp may be produced from mechanical pulp, thermochemical pulp, chemical pulp such as sulphate (kraft) or sulphite pulp, dissolving pulp, organosolv pulp or chemi-thermomechanical pulp (CTMP), or combinations thereof. Preferably, the cellulose fiber material is chemical pulp, such as kraft pulp. The pulp is preferably delignified and processed according to known methods in the art. One preferred source of fiber is an ECF or TCF bleached kraft pulp.

The aqueous suspension may comprise microfibrillated cellulose (MFC). In some embodiments, the aqueous suspension comprises ≤10 weight-%, preferably ≤8 weight-%, more preferably ≤5 weight-%, of MFC based on total dry weight of the aqueous suspension. In some embodiments, the aqueous suspension comprises 1-10 weight-%, or 1-8 weight-% or 1-5 weight-% MFC based on total dry weight of the aqueous suspension.

Microfibrillated cellulose (MFC) shall in the context of this patent application mean a cellulose particle, fiber or fibril having a width or diameter of from 20 nm to 1000 nm.

Various methods exist to make MFC, such as single or multiple pass refining, pre-hydrolysis followed by refining or high shear disintegration or liberation of fibrils. One or several pre-treatment steps is usually required in order to make MFC manufacturing both energy efficient and sustainable. The cellulose fibers of the pulp used when producing MFC may thus be native or pre-treated enzymatically or chemically, for example to reduce the quantity of hemicellulose or lignin. The cellulose fibers may be chemically modified before fibrillation, wherein the cellulose molecules contain functional groups other (or more) than found in the original cellulose. Such groups include, among others, carboxymethyl (CM), aldehyde and/or carboxyl groups (cellulose obtained by N-oxyl mediated oxidation, for example "TEMPO"), or quaternary ammonium (cationic cellulose). After being modified or oxidized in one of the above-described methods, it is easier to disintegrate the fibers into MFC.

MFC can be produced from wood cellulose fibers, both from hardwood or softwood fibers. It can also be made from microbial sources, agricultural fibers such as wheat straw pulp, bamboo, bagasse, or other non-wood fiber sources. It can be made from pulp, including pulp from virgin fiber, e.g. mechanical, chemical and/or thermomechanical pulps. It can also be made from broke or recycled paper.

The aqueous suspension may in addition to highly refined cellulose pulp and optional further pulp fraction(s) comprise any conventional paper making additives or chemicals such as fillers, pigments, wet strength chemicals, retention chemicals, cross-linkers, softeners or plasticizers, adhesion primers, wetting agents, biocides, optical dyes, colorants, fluorescent whitening agents, de-foaming chemicals, hydrophobizing chemicals such as AKD, ASA, waxes, resins, bentonite, stearate, wet end starch, silica, precipitated calcium carbonate, cationic polysaccharide, etc. These additives or chemicals may thus be process chemicals or film performance chemicals added to provide the end product film with specific properties and/or to facilitate production of the film. Preferably, the aqueous suspension comprises no more than 20 weight-%, more preferably no more than 10 weight-% of additives, based on total dry weight of the aqueous suspension. For example, the aqueous suspension may comprise 1-20 weight-% or 1-10 weight-% of additives, based on total dry weight of the aqueous suspension.

As mentioned above, the method of the first aspect comprises a step of forming a wet web from the aqueous suspension. The wet web may be formed by, for example, wet laid techniques, such as e.g. a papermaking process, or at least a modified papermaking process. These processes may include wet wire formation on a wire. Preferably, the wet web is formed on a porous support such as a porous wire.

In a wire forming technique a pulp suspension is provided and dewatered on a porous surface to form a fibrous wet web. A suitable porous surface is e.g. porous wire in e.g. a paper machine. The wet web is then dried and/or further dewatered in e.g. a drying section in a paper machine to form a substrate.

Thus, the wet web may be formed in a papermaking machine such as a fourdrinier or other forming types such as Twin-former or hybrid former. The web can be single or multilayer web or single ply or multiply web, made with one or several headboxes.

As mentioned above, the method of the first aspect comprises a step of dewatering and/or drying the wet web to form a substrate having a first side and an opposite second side (i.e. a second side facing away from the first side). The dewatering and/or drying may be performed by any conventional techniques, such as press dewatering, hot air drying, contacting it with hot or warm cylinder or metal belt, irradiation drying or through vacuum, etc.

When the wet web is formed by the wet laid method, the wet web formed on a porous wire is dewatered through the wire and optionally also by press dewatering in a subsequent press section.

In some embodiments, the substrate obtained in the step of dewatering and/or drying (i.e. before the calendering step) has a density of 600-950 kg/m$^3$, preferably 650-900 kg/m$^3$, most preferably 700-850 kg/m$^3$. Thus, in some embodiments the substrate has a density of 600-950 kg/m$^3$, preferably 650-900 kg/m$^3$, most preferably 700-850 kg/m$^3$ when entering the calendering step.

In some embodiments, the basis weight of the substrate obtained in the step of dewatering and/or drying (i.e. before the calendering step and the first coating step), is less than 90 g/m$^2$, more preferably less than 80 g/m$^2$, most preferably less than 75 or less than 70 or less than 65 or less than 40 g/m$^2$, but higher than 15 g/m$^2$.

Preferably, the calendering step and/or the first coating step are carried out on-line after the step of dewatering and/or drying. However, the calendering step and/or the first coating step may also be carried out in a machine and/or location different from that of the step of dewatering and/or drying (i.e. the calendering step and/or the first coating step may be performed off-line).

In some embodiments, the Gurley Hill porosity value of the substrate obtained in the step of dewatering and/or drying the wet web (i.e. after having performed the step of dewatering and/or drying) and the step of calendering is at least 20000 s/100 ml typically at least 25000 s/100 ml, or at least 30000 s/100 ml. The Gurley Hill value can be determined using the standard method ISO 5636-5, wherein the max value is 42300 s/100 ml. Other devices might have other max values and use other standards.

As mentioned above, the method of the first aspect comprises calendering the substrate in at least a first calender nip in a first calendering step and a second calender nip in a second calendering step. The first calender nip and the second calender nip may respectively be constituted by a calender nip selected from the group consisting of: a soft calender nip, a hard calender nip, a super calender nip, a belt calender nip and a nip in a multi-nip calender. Thus, the first calender nip and the second calender nip may be comprised in the same or different calender units/devices. Any combinations of calenders and calender nips may be possible. Thus, for example the first calender nip may be positioned in one calender device and the second calender nip may be positioned in another calender device. In another example, the first calender nip and the second calender nip are comprised in the same calender device, such as a multi-nip calender.

Thus, the calendering may comprise two calendering steps, i.e. the first and second calendering steps, but may also comprise one or more further calendering steps being performed in a calender nip e.g. selected from the group above. Thus, the calendering may comprise calendering in three, four, five or more calender nips, which may be positioned in the same or different calender devices/units.

The term "soft calender" (or "soft nip calender") is herein intended to mean a calender having a soft roll cover on at least one of its two nip rolls. Thus, one of the two rolls may be a soft roll and the other roll a hard roll (which hard roll is optionally heated). Alternatively, both rolls may be soft rolls.

The term "soft calender nip" is herein intended to mean a nip in a calender between a soft roll and a hard roll, or between two soft rolls. The soft calender nip may be comprised in a soft calender or in a multi-nip calender. Example of hardness of the soft calender nip is e.g. 88-97 Shore D, preferably 85-94.

The term "hard calender nip" is herein intended to mean a nip in a calender having two hard rolls as the two nip rolls. The hard calender nip may be comprised in a hard calender or in a multi-nip calender. A hard calender nip may be a machine calender nip.

The term "super calender nip" is herein intended to mean a nip in a super calender.

The term "belt calender nip" is herein intended to mean a nip in a belt calender.

In some embodiments, the first calender nip is a hard calender nip and the second calender nip is a soft calender nip. In some embodiments, the first calender nip is a soft calender nip and the second calender nip is a soft calender nip. In some embodiments, the first calender nip is a hard calender nip and the second calender nip is a super calender nip. In some embodiments, the first calender nip is a belt calender nip and the second calender nip is a soft calender nip. In some embodiments, the first calender nip is a hard calender nip and the second calender nip is a belt calender nip.

In some embodiments comprising one soft calender nip, the soft calender nip comprises a soft roll and a hard roll, wherein the soft roll or the hard roll may be positioned against the first side of the substrate. Preferably, the hard roll is positioned against the first side of the substrate in these embodiments.

In some embodiments comprising two or more soft calender nips, all soft calender nips comprise a soft roll and a hard roll. At least one hard roll may then be positioned against the first side of the substrate. Alternatively, all hard rolls are positioned against the first side of the substrate.

In some embodiments, the first calender nip is a hard calender nip and the second calender nip is a soft calender nip, wherein the hard calender nip is positioned in one calender device and the soft calender nip is positioned in another calender device. In some of these embodiments, the soft calender nip comprises a soft roll and a hard roll. Preferably, the hard roll is positioned against the first side.

In some embodiments, the first calender nip is a hard calender nip and the second calender nip is a soft calender nip, wherein the hard calender nip and the soft calender nip is positioned in the same calender device, such as a multi-nip calender. In some of these embodiments, the soft calender nip comprises a soft roll and a hard roll. Preferably, the hard roll is positioned against the first side.

As mentioned above, the moisture content of the substrate is 1-25 weight-%, preferably 2-20 weight-%, more preferably 3-15 weight-%, when entering the first calender nip. The moisture content of the substrate may be 1-25 weight-%, preferably 2-20 weight-%, more preferably 3-15 weight-%, also when entering the second calender nip.

The mentioned moisture content of the substrate in the first calendering step (i.e. when entering the first calender nip) and optionally the second calendering step may be provided, or essentially provided, in the step of dewatering and/or drying. Alternatively, the method may further comprise a step of pre-moisturizing the substrate prior to the first calendering step and optionally the second calendering step. It may also be possible to add moisture during the first calendering step and optionally the second calendering step. The pre-moisturizing may be performed by using steam or water with or without chemicals. In some embodiments, 1-15 $g/m^2$, preferably 2-10 $g/m^2$, most preferably 2.5-8 $g/m^2$ steam or water is applied. In some embodiments, the temperature may be increased by at least 10° C., or at least 20° C. during the pre-moisturizing with steam or water. Thereby, the substrate may be easier to plasticize and restructure during the calendering As mentioned above, the method of the first aspect comprises providing the substrate with at least one first layer of a) a water-based solution or dispersion comprising a polymer selected from the group consisting of: a polyvinyl alcohol, a modified polyvinyl alcohol, a polysaccharide or a modified polysaccharide, or combinations thereof on the first side in a first coating step to form a coated substrate.

Thus, in the first coating step the substrate is provided with one or more first layers of a water-based solution/ dispersion of a barrier chemical selected from group a). Each first layer har a coat weight of 0.5-5 gsm, preferably 0.5-3 gsm, more preferably 1-2.5 gsm, calculated as dry weight. The total coat weight of the one or more first layer on the first side is equal to or less than 8 gsm, preferably equal to or less than 6 gsm, most preferably equal to or less than 5 gsm calculated as dry weight.

In some embodiments, the method of the first aspect further comprises providing said substrate with at least one second layer of the water-based solution or dispersion selected from group a) above. Each second layer has a coat weight of 0.5-5 gsm, preferably 0.5-3 gsm, more preferably 1-2.5 gsm, calculated as dry weight. In these embodiments, the total coat weight of the at least one first layer on the first side is equal to or less than 5 gsm calculated as dry weight and the total coat weight of the at least one second layer on the second side is equal to or less than 5 gsm calculated as dry weight.

Each first layer may be continuous or non-continuous and may have the same or different thickness at different locations on the first side of the substrate.

Each second layer may be continuous or non-continuous and may have the same or different thickness at different locations on the second side of the substrate.

For example, a non-continuous layer may have a degree of coverage of the substrate of at least 60% or 70% or 75% or 80%.

The first layer(s) and the second layer(s) may be applied by contact or non-contact coating methods. Examples of useful coating methods include, but are not limited to, rod coating, curtain coating, film press coating, cast coating, transfer coating, size press coating, flexographic coating, gate roll coating, twin roll HSM coating, blade coating, such as short dwell time blade coating, jet applicator coating, spray coating, gravure coating or reverse gravure coating. In some embodiments, at least one layer is applied in the form a foam.

The polyvinyl alcohol (PVOH) of group a) above may be a single type of PVOH, or it can comprise a mixture of two or more types of PVOH, differing e.g. in degree of hydrolysis or viscosity. The PVOH may for example have a degree of hydrolysis in the range of 80-99 mol %, preferably in the range of 85-99 mol %. Furthermore, the PVOH may preferably have a viscosity above 5 mPa×s in a 4% aqueous solution at 20° C. DIN 53015/JIS K 6726 (with no additives and with no change in pH, i.e. as obtained when dispersed and dissolved e.g. in distilled water). Examples of useful products are, e.g. Kuraray Poval 15-99, Poval 4-98, Poval 6-98, Poval 10-98, Poval 20-98, Poval 30-98, or Poval 56-98 or mixtures of these. From the less hydrolyzed grades, the Poval 4-88, Poval 6-88, Poval 8-88, Poval 18-88, Poval 22-88, or e.g. Poval 49-88 are preferred. The PVOH can also be modified with alkyl substituents such as ethylene groups, or anionic groups such as carboxylic acid groups, or other functional groups such as cationic or silanol groups. The PVOH may be washed or be of a low ash content grade.

The polysaccharide of group a) above may be, for example, starch.

The modified polysaccharide of group a) above may be, for example, a modified cellulose, such as carboxymethyl-cellulose (CMC), hydroxypropyl cellulose (HPC) ethylhy-droxyethyl cellulose (EHEC) or methyl cellulose, or a modified starch, such as a hydroxyalkylated starch, a cya-noethylated starch, a cationic or anionic starch, or a starch ether or a starch ester. Another example of a modified cellulose is sodium carboxymethylcellulose. Some preferred modified starches include hydroxypropylated starch, hydroxyethylated starch, dialdehyde starch and carboxym-ethylated starch.

In some embodiments, the substrate is provided with at least one first layer of a water-based solution or dispersion comprising polyvinyl alcohol in the first coating step. In some embodiments, the substrate is provided with at least one second layer of a water-based solution or dispersion comprising polyvinyl alcohol in the second coating step.

In some embodiments, the calendering comprising at least the first calendering step and the second calendering step is performed before the first coating step. In these embodi-ments, the optional second coating step may be performed after the first coating step or essentially simultaneously as the first coating step. In these embodiments, one or more additional calendering steps may be performed after the first coating step and/or after the optional second coating step. The additional calendering step may comprise calendering said coated substrate in at least one further calender nip selected from the group of: a soft calender nip, a hard calender nip, a super calender nip and a belt calender nip.

In some embodiments, the first coating step is performed before the calendering comprising at least the first calen-dering step and the second calendering step. In these embodiments, the optional second coating step may be performed essentially simultaneously as the first coating step, or after the first coating step but before the calendering comprising at least the first calendering step and the second calendering step. Alternatively, the optional second coating step may be performed after the calendering in at least the first calendering step and second calendering step. Still alternatively, the optional second coating step may be per-formed between the first calendering step and the second calendering step.

As mentioned above, the method of the first aspect comprises a step of drying said coated substrate after the calendering and the first coating step so as to form the barrier film. In embodiments comprising one or more further and/or additional calendering steps and/or one or more further coating steps (such as the above mentioned second coating step), the step of drying is performed after the further calendering step(s) and/or the further coating step(s). Preferably, the drying is performed so that the temperature of the substrate is >80° C. and preferably >85° C. for facilitating film forming.

The formed barrier film has a thickness of less than 50 μm, preferably less than 45 μm, most preferably less than 40 μm or less than 38 μm or less than 35 μm or less than 32 μm, but more than 15 μm. The thickness may be determined accord-ing to ISO 534. The grammage of the formed barrier film (i.e. of the substrate after coating and drying) may be 20-90 $g/m^2$, preferably 25-80 $g/m^2$, most preferably 28-65 $g/m^2$. The grammage may be determined according to ISO 536. In some embodiments, the grammage of the formed barrier film may be 20-90 $g/m^2$, preferably 25-80 $g/m^2$, most preferably 28-65 $g/m^2$ and the ratio of coating grammage to substrate grammage may be in the range of 0.8:100-30:100, more preferably 1:100-15:100 for barrier films with gram-mage below 40 $g/m^2$, and 0.6:100-25:100, more preferably 1:100-12:100 for barrier films with grammage above 40 $g/m^2$.

The step of drying the coated substrate can for example be performed using hot air, IR radiation, or a combination thereof. The coated substrate can also be further dried and cured in e.g. contact or non-contact driers selected from the group consisting of: cylinder drying apparatus, yankee dryer, single tier dryer, steam dryer, air impingement dryer, impulse drying apparatus, microwave drying apparatus, Condebelt, belt nip dryer, through air dryer (TAD). Alter-natively, the step of drying can be performed in a calender, e.g. by combining hot air and/or radiation dryer with cal-ender.

In some embodiments, the calendering in at least the first calendering step and the second calendering step comprises using a line load of up to 500 KN/m, preferably 20-250 KN/m.

In some embodiments, the calendering in at least the first calendering step and the second calendering step is per-formed at a temperature of 50-250° C., preferably 80-180° C.

In some embodiments, the machine speed is at least 50 m/min, preferably at least 100 m/min, more preferably 150 or 200 or 250 or 300 or 400 or 500 m/min, most preferably at least 550 m/min, but less than 1700 m/min.

In some embodiments, the barrier film has an oxygen transmission rate (OTR), measured according to the stan-dard ASTM D-3985 at 50% relative humidity and 23° C., of less than 200 $cc/m^2$/day, preferably less than 100 $cc/m^2$/day, most preferably less than 50 $cc/m^2$/day (for a coated side).

In some embodiments, the obtained barrier film has a water vapor transmission rate (WVTR), measured according to the standard ASTM F1249 at 50% relative humidity and 23° C., of less than 250 $g/m^2$/day, preferably less than 100 $g/m^2$/day, more preferably less than 50 $g/m^2$/day or less than 30 $g/m^2$/day (for a coated side).

The inventive barrier film will typically exhibit good resistance to grease and oil. Grease resistance of the barrier film is evaluated by the KIT-test according to standard ISO 16532-2. The test uses a series of mixtures of castor oil, toluene and heptane. As the ratio of oil to solvent is decreased, the viscosity and surface tension also decrease, making successive mixtures more difficult to withstand. The performance is rated by the highest numbered solution which does not darken the film sheet after 15 seconds. The highest numbered solution (the most aggressive) that remains on the surface of the paper without causing failure is reported as the "kit rating" (maximum 12). In some embodiments, the KIT value of the barrier film is at least 10, preferably 12, as measured according to standard ISO 16532-2.

There is a demand for improved solutions to replace aluminum foils and polyolefin films as barrier layers in packaging materials, such as liquid packaging board, with alternatives that facilitate re-pulping and recycling of the used packaging materials. The inventive barrier film can advantageously be manufactured almost entirely from biobased materials, and preferably from cellulose based materials, thereby facilitating re-pulping and recycling of used paper and paperboard based packaging materials comprising the barrier film. Also, by minimizing the amount of coating (i.e. by enabling use of a low coat weight in accordance with the present disclosure), a barrier film is provided that is easier to recycle and reuse as part of the base web.

In some embodiments, the tensile strength index of the barrier film in the machine direction is >60 Nm/g, preferably >70 Nm/g and most preferably >80 Nm/g, and the tensile strength index of the barrier film in the cross-machine direction is >30 Nm/g, preferably >40 Nm/g and more preferably >50 Nm/g when determined according to the ISO 1924-3.

In some embodiments, the tensile stiffness index of the barrier film in the machine direction is >9 kNm/g, preferably >9.5 kNm/g and more preferably >10 kNm/g and the tensile stiffness index of the barrier film in the cross-machine direction is >3.5 kNm/g, preferably >4 kNm/g and more preferably >4.5 kNm/g, when determined with ISO 1924-3.

The above strength properties of the sheets are on surprisingly high level which is believed to be due to the characteristic fiber mix used in the invention and to the subjected calendering conditions.

The above strength properties imply that the barrier film has good mechanical properties, i.e. tensile properties, being suitable for vacuum deposition coating. Thus, the barrier film has good properties for enabling with-standing vacuum deposition coating.

According to a second aspect of the present disclosure there is provided a barrier film obtainable by the method of the first aspect.

However, the inventive barrier film may also be utilized as a substrate for vacuum deposition coating. Thus, the inventive barrier film may also be utilized in a laminate together with a vacuum coating layer on at least the first side of the barrier film (i.e. at least on the at least one first layer on the first side of the barrier film).

According to a third aspect of the present disclosure, there is provided a method of producing a barrier film laminate, e.g. for a paper or paper-based packaging material, comprising the barrier film obtainable by the method according to the first aspect, wherein the method comprises the steps of:

performing the method according to the first aspect so as to form the barrier film, and applying a vacuum coating layer having a thickness in the range of 0.1-500 nm on at least said first side of said barrier film to form said barrier film laminate.

Vacuum coating refers to a family of processes used to deposit layers of material atom-by-atom or molecule-by-molecule on a solid surface. These processes operate at pressures well below atmospheric pressure (i.e. under vacuum). The deposited layers can range from a thickness of one atom up to millimeters, although in the present context, the coating layer should have a thickness in the range of 0.1-500 nm, preferably 1-500 nm, more preferably 5-200 nm and most preferably 10-150 nm. Multiple layers of the same or different materials can be combined. The process can be further specified based on the vapor source; physical vapor deposition (PVD) uses a liquid or solid source and chemical vapor deposition (CVD) uses a chemical vapor.

In some embodiments, the vacuum coating layer (also referred to as vacuum deposition coating layer) is formed by vapor deposition of a metal or metal oxide on the substrate, preferably by physical vapor deposition (PVD) or chemical vapor deposition (CVD) or atomic layer deposition (ALD).

In a preferred embodiment, the "vacuum coating layer" is a thin layer of metal or metal oxide providing barrier properties reducing permeability to e.g. oxygen or other gases or aromas, water vapor and light.

In some embodiments, only one of the surfaces (i.e. on the first side) of the barrier film is subjected to vacuum coating. In some embodiments, both surfaces (i.e. on both the first side and the second side) of the barrier film are subjected to vacuum coating.

In some embodiments, the vacuum coating layer is formed by vapor deposition of a metal or metal oxide on the substrate, preferably by physical vapor deposition (PVD) or chemical vapor deposition (CVD), more preferably by physical vapor deposition (PVD).

The vacuum coating layer of the present invention preferably comprises a metal or metal oxide. Vacuum coating of a metal or metal oxide is often also referred to as metallization, and a vacuum coating layer of a metal or metal oxide can also be referred to as a "metallization layer".

In some embodiments, the vacuum coating layer comprises a metal or metal oxide selected from the group consisting of aluminum, magnesium, silicon, copper, aluminum oxides, magnesium oxides, silicon oxides, and combinations thereof, preferably an aluminum oxide. Aluminum oxide vacuum coatings also known as AlOx coatings can provide similar barrier properties as aluminum metal coatings, but have the added advantage of thin AlOx coatings being transparent to visible light.

Thin vacuum deposited layers are normally merely nanometer-thick, i.e. have a thickness in the order of magnitude of nanometers. The vacuum coating layer of the present invention has a thickness in the range of from 0.1 to 500 nm. In some embodiments, the vacuum coating layer has a layer thickness in the range of 10-100 nm, preferably in the range of 20-50 nm.

One type of vapour deposition coating, sometimes used for its barrier properties, in particular water vapour barrier properties, is an aluminum metal physical vapour deposition (PVD) coating. Such a coating, substantially consisting of aluminum metal, may typically have a thickness of from 10 to 50 nm. The thickness of the metallization layer which corresponds to less than 1% of the aluminum metal material typically present in an aluminum foil of conventional thickness for packaging, i.e. 6.3 μm.

In some embodiments, the vacuum coating layer has a basis weight in the range of 50-250 mg/m$^2$, preferably in the range of 75-150 mg/m$^2$.

In some embodiments, the barrier film laminate comprising the inventive barrier film and a vacuum coating layer has an oxygen transmission rate (OTR), measured according to the standard ASTM D-3985 at 50% relative humidity and 23° C., of less than 100 cc/m$^2$/day, preferably less than 75 cc/m$^2$/day, more preferably less than 50 cc/m$^2$/day and most preferably less than 25 cc/m$^2$/day or 15 cc/m$^2$/day or 10 cc/m$^2$/day (for a coated side).

In some embodiments, the barrier film laminate comprising the inventive barrier film and a vacuum coating layer has a water vapor transmission rate (WVTR) value, measured according to the standard ASTM F1249 at 50% relative humidity and 23° C., of less than 20 g/m²/day, preferably less than 10 g/m²/day, most preferably less than 5 g/m²/day or less than 2 g/m²/day (for a coated side).

According to a fourth aspect of the present disclosure there is provided a barrier film laminate obtainable by the method of the third aspect.

According to a fifth aspect of the present disclosure there is provided a method of producing a paper or paperboard based packaging material laminate, comprising the steps of:

performing the method according to the first aspect so as to produce the barrier film or the method according to the third aspect so as to produce the barrier film laminate, and laminating the barrier film or the barrier film laminate with a paper or paperboard base material to produce a paper or paperboard based packaging material laminate.

The paper or paperboard base layer used in the paper or paperboard based packaging material may have a basis weight in the range of 20-500 g/m², preferably in the range of 80-400 g/m².

According to a sixth aspect of the present disclosure there is provided a paper or paperboard based packaging material laminate obtainable by the method according to the fifth aspect.

The barrier film or barrier film laminate can also be part of a flexible packaging material, such as a free-standing pouch or bag. The barrier film or barrier film laminate can be incorporated into any type of package, such as a box, bag, a wrapping film, cup, container, tray, bottle etc.

According to a seventh aspect of the present disclosure there is provided a barrier film comprising a coated substrate, wherein said substrate comprises at least 70 weight-% highly refined cellulose pulp, wherein said highly refined cellulose pulp has a Schopper-Riegler value of 70-95° SR, and wherein said highly refined cellulose pulp has a content of fibers having a length>0.2 mm of at least 10 million fibers per gram based on dry weight;

wherein said substrate has a first side and a second opposite side;

wherein said substrate is provided with at least one first layer comprising:

b) a polymer selected from the group consisting of: a polyvinyl alcohol, a modified polyvinyl alcohol, a polysaccharide or a modified polysaccharide, or combinations thereof, on the first side, wherein each first layer has a coat weight of 0.5-5 gsm, preferably 0.5-3 gsm, calculated as dry weight, and wherein a total coat weight on the first side is equal to or less than 8 gsm calculated as dry weight;

wherein the barrier film has a thickness of less than 50 μm, preferably less than 45 μm, most preferably less than 40 μm, wherein the tensile strength index of the barrier film in the machine direction is >60 Nm/g and the tensile strength index of the barrier film in the cross-machine direction is >30 Nm/g, and

wherein the tensile stiffness index of the barrier film in the machine direction is >9 kNm/g and the tensile stiffness index of the barrier film in the cross-machine direction is >3.5 kNm/g.

The barrier film may be further defined as set out above with reference to the method of the first aspect.

According to an eighth aspect of the present disclosure there is provided a barrier film laminate comprising a barrier film according to the seventh aspect laminated with a vacuum coating layer having a thickness in the range of 0.1-500 nm. The barrier film laminate may have a water vapor transmission rate of less than 20 g/m²/day, preferably less than 10 g/m²/day, measured according to the standard ASTM F1249 at 50% relative humidity and 23° C. The barrier film laminate may be further defined as set out above with reference to the method of the third aspect.

According to a ninth aspect of the present disclosure there is provided a paper or paperboard based material comprising a barrier film according to the seventh aspect or a barrier film laminate according to the eighth aspect laminated with a paper or paperboard base material.

According to a tenth aspect of the present disclosure there is provided use of a barrier film according to the second aspect or the seventh aspect or a barrier film laminate according to the fourth aspect or the eighth aspect in a paper or paperboard based packaging material.

EXAMPLES

Methods

In the below Examples, the following measurement methods were used:

Water vapor transmission rate (WVTR) was measured according to the standard ASTM F1249 at 50% relative humidity and 23° C.

Oxygen transmission rate (OTR) was measured according to the standard ASTM D-3985 at 50% relative humidity and 23° C.

Grammage was determined according to ISO 536

PPS 1.0 MPa smoothness was determined according to ISO 8791-4

Air resistance (Gurley Hill, G-H) values were measured according to ISO 5636-5. Max value with the device was 42 300 s/100 ml Bendtsen roughness was determined according to ISO 8791-2

Schopper Riegler values (°SR) were measured according to standard ISO 5267-1

Thickness (single sheet) was determined according to ISO 534

Cobb600 (600 s) was determined according to ISO 535

Cobb-Unger 30 s. was determined according to SCAN-P 37:77

The content of fibers having a length>0.2 mm was determined using the L&W Fiber tester Plus instrument (L&W/ABB). A known sample weight of 0.100 g was used and the content of fibers having a length>0.2 mm (million fibers per gram) was calculated using the following formula: Million fibers per gram=(No. fibers in sample)/(Sample weight)/1 000 000=(Property ID 3141)/property ID 3136)/1 000 000

The mean fibril area was determined using the L&W Fiber Tester Plus instrument (L&W/ABB) with definition of fibers as fibrous particles longer than 0.2 mm according to standard ISO 16065-2. "Mean fibril area" as used herein refers to length weighted mean fibril area.

The water retention value (WRV) was determined by standard ISO 23714 with the use of a 200 mesh wire.

"ts" means top side and "bs" means back side

The results are shown in Tables 1a-b and 2a-b below.

Example 1 (Comparative)

The sample was a 50 gsm supercalendered (SC) paper comprising mechanical fibers. The paper is commercially available on the market. The sample had high density and low thickness. After coating the sheets with PVOH coating (3 times), the air permeability was significantly improved which was also seen in low OTR values. After metallization (vacuum coating deposition) with aluminum, the OTR value was high whereas the WVTR value was significantly improved.

Example 2 (Comparative)

This sample was a soft and supercalendered commercial grade comprising virgin mechanical fibers. The 44 gsm SC paper had slightly lower density than the sample used in Example 1. Before PVOH coating, the grade was more porous than the sample used in Example 1. After PVOH coating, the air permeability was significantly improved, and oxygen barrier properties could be measured. After metallization (vacuum coating deposition) with aluminum, the OTR level was further improved but not on the highest level.

Example 3 (Comparative)

In this case, a 32 gsm machine glatted paper was used. This was also a commercial sample. The paper had high air permeability before coating with PVOH, whereas the surface was closed after PVOH coating. Oxygen gas barrier properties could be determined after PVOH coating, whereas parallel measure gave high values.

Example 4 (Comparative)

In this example, a commercial 80 gsm one side mineral coated paper which has been supercalendered was used. After PVOH coating, the air permeance was significantly improved, whereas OTR was on high level. After metallization (vacuum coating deposition) with aluminum, the oxygen gas barrier properties were relatively high, whereas the WVTR properties were very good.

Example 5 (Comparative)

In this case, a film made from very fine microfibrillated cellulose was used. The sample contained substantially no residual fiber and amount of fibers having a length>0.2 mm was less than 3 million. The mean fibril area of fibers having a length>0.2 mm determined for the sample was slightly less than 15%. The MFC has been enzymatically treated before fluidization and cast formed into a film. The film was not calendered or coated with PVOH. Before metallization, the OTR properties were very good which is expected and in agreement with literature. After metallization (vacuum coating deposition) with aluminum, the barrier properties were further improved. However, the sample was very brittle and sensitive to mechanical handling after metallization.

Example 6 (Comparative)

In this case, a base substrate comprising 70 wt % highly refined pulp having an SR value of 92-94° SR made from bleached kraft pulp and 30 wt % kraft pulp (unrefined) was utilized. The amount of fibers having length of >0.2 mm was slightly above 15 million per gram of fiber and the mean fibril area of fibers having a length>0.2 mm was about 25% for the highly refined pulp. The WRV for the highly refined pulp was about 380% and for the 70-30% mixture about 300%. The pulp mixture described above was used to prepare the base substrate using a Fourdrinier machine comprising a wet forming section followed by press and drying section. The substrate was not subjected to calendering. The substrate had high air permeancy value but basically no barrier properties before coated with PVOH. After coating with PVOH, the air permeance was significantly improved, whereas OTR level were on moderate level. Small improvement was seen after metallization (vacuum coating deposition) with aluminum.

Example 7

The base substrate of Example 6 was soft calendered using hard-nip, soft nip combination. The moisture content when entering the hard-nip was about 4-5% after steam treatment. The hardness of the soft cylinder was about 88 Shore D and diameter 88 cm. Machine speed was 200 m/min. Compared to Example 6, a significant improvement in the thickness were obtained. After PVOH coating, a clear improvement in the OTR level could be seen. Metallization (vacuum coating deposition) with aluminum improved further both OTR level and in particular WVTR level.

Example 8

The substrate used in Example 6 was PVOH coated before using the calender combination mentioned in Example 7. In this case, both density and thickness were improved. After further PVOH coating, the OTR level was on very good level, but increased slightly after metallization (vacuum coating deposition) with aluminum.

Example 9

In this case, a base substrate comprising 100% of highly refined pulp having an SR value of 92-94° SR made from bleached kraft pulp was used. The amount of fibers having length of >0.2 mm was slightly above 15 million per gram of fiber and the mean fibril area of fibers having a length>0.2 mm was about 25% for the highly refined pulp. The WRV for the highly refined pulp was about 380% and for the 70-30% mixture about 300%. The substrate was machine calendered (hard nip) before applying the soft calendering. The moisture content when entering the hard-nip was about 5%. This substrate had relatively good barrier before PVOH coating. After PVOH coating, the OTR properties were significantly improved. After metallization (vacuum coating deposition) with aluminum, the OTR level was still on high level although a small change was seen.

Example 10

In this case, the substrate used in Example 9 was subjected to machine calender (hard nip) and then to a supercalender. The moisture content when entering the hard-nip was about 5% and when entering the super-calender about 4-5%. Before supercalender, about 5 g/m² steam was applied to the surface. Before PVOH coating, the properties were roughly on same level as for the base substrate in example 9. After PVOH coating and subsequent metallization, both the OTR and WVTR levels were very good.

20

Example 11

In this case, the Example 6 was made but with MFB (machine finishing) calender. After PVOH coating, and metallization (vacuum coating deposition) with aluminum, the barrier properties were improved but not as efficient as in Example 10.

TABLE 1a

| TP # | 1 (Ref) | 2 (Ref) | 3 (Ref) | 4 (Ref) | 5 (Ref) |
|---|---|---|---|---|---|
| Coating inline. one side | No | No | No | Mineral | no |
| Calendering | Super | Super and soft | Soft | Super | no |
| Base material properties | | | | | |
| Grammage g/m² | 50.1 | 44.2 | 32.5 | 79.9 | 28 |
| Thickness. μm | 42 | 49 | 46 | 79 | 29 |
| Density. kg/m3 | 1199 | 902 | 705 | 1007 | 955 |
| Tensile strength. kN/m. MD | 3.14 | 2.68 | 4.06 | 4.73 | 1.71 |
| Tensile strength. kN/m. CD | 0.8 | 0.83 | 1.53 | 1.57 | 1.56 |
| Tensile index. Nm/g. MD | 62.7 | 60.6 | 124.9 | 59.2 | 61.1 |
| Tensile index. Nm/g. CD | 16.0 | 18.8 | 47.1 | 19.6 | 55.7 |
| Tensile stiffness. kN/m. MD | 490.1 | 395.7 | 432.3 | 591.7 | 214 |
| Tensile stiffness. kN/m. CD | 146.3 | 105.1 | 192.7 | 200.5 | 196 |
| Tensile stiffnes index. kNm/g. MD | 9.8 | 9.0 | 13.3 | 7.4 | 7.6 |
| Tensile stifness index. kNm/g. CD | 2.9 | 2.4 | 5.9 | 2.5 | 7.0 |
| Stretch at break. %. MD | 1.06 | 0.92 | 1.61 | 1.58 | 1.6 |
| Stretch at break. %. CD | 1.74 | 1.61 | 1.92 | 3.38 | 1.6 |
| Surface smoothness. PPS 1.0 MPa. μm. TS | 1.2 | 1.76 | 3.61 | 0.93 | 3.06 |
| Surface smoothness. PPS 1.0 MPa. μm. BS | 1.26 | 1.85 | 6.66 | 2.53 | 3.23 |
| Roughness Bendtsen. ml/min. TS | 16 | 23 | 92 | 9 | |
| Roughness Bendtsen. ml/min. BS | 12 | 25 | 537 | 32 | |
| Cobb 60. g/m² TS | 63.1 | 72 | 23.3 | | |
| Air resistance Gurley. s. TS | 1169 | 146 | 280 | | 42300 |
| Air resistance Gurley. s. BS | | | | 827 | |
| OTR 23 C. 50% RH | 2000 | 2000 | 2000 | 2000 | 1 |
| WVTR 23 C. 50% RH | | | | | |
| Moisture content at 50% RH. % | 5.7 | 6.98 | 7.68 | 5.42 | |
| Precoated sheet | | | | | |
| Coat weight (g/m2) | 4 | 4 | 4 | 4 | |
| Coating passages | 3 | 3 | 3 | 3 | |
| Surface smoothness when precoated. PPS 1.0 MPa. μm. PVOH coated side | 2.38 | 3.5 | 3.64 | 3.98 | |
| Air resistance Gurley. s. PVOH coated side | max | max | max | max | |
| OTR 23 C. 50% RH (min) | 4.2 (90) | 90 (2000) | 94 (2000) | 1411 (2000) | |

TABLE 1b

| TP # | 6 (Ref) | 7 | 8 | 9 | 10 | 11 (ref) |
|---|---|---|---|---|---|---|
| Coating inline. one side | No | No | PVOH | No | No | No |
| Calendering | No | Soft | Soft | Soft | Super | Soft |
| Base material properties | | | | | | |
| Grammage g/m² | 31.5 | 31.5 | 32.1 | 30.4 | 30.2 | 31.5 |
| Thickness. μm | 46 | 30 | 27 | 36 | 30 | 30 |
| Density. kg/m3 | 681 | 1042 | 1177 | 835 | 1018 | 1042 |
| Tensile strength. KN/m. MD | 2.89 | 2.58 | 2.97 | 3.21 | 3.31 | 2.58 |
| Tensile strength. KN/m. CD | 1.26 | 1.34 | 1.3 | 1.63 | 1.62 | 1.34 |
| Tensile index. Nm/g. MD | 91.7 | 81.9 | 92.5 | 105.6 | 109.6 | 81.9 |
| Tensile index. Nm/g. CD | 40.0 | 42.5 | 40.5 | 53.6 | 53.6 | 42.5 |
| Tensile stiffness. KN/m. MD | 365.7 | 378.6 | 387 | 369.3 | 372.5 | 378.6 |
| Tensile stiffness. KN/m. CD | 113.7 | 160.8 | 160.2 | 170.7 | 188.5 | 160.8 |
| Tensile stiffnes index. kNm/g.MD | 11.6 | 12.0 | 12.1 | 12.1 | 12.3 | 12.0 |
| Tensile stiffness index. kNm/g. CD | 3.6 | 5.1 | 5.0 | 5.6 | 6.2 | 5.1 |
| Stretch at break. %. MD | 1.26 | 1.12 | 1.56 | 1.56 | 1.99 | 1.12 |
| Stretch at break. %. CD | 2.48 | 2.3 | 2.98 | 2.82 | 4.34 | 2.3 |
| Surface smoothness. PPS 1.0 MPa. μm. TS | 6.98 | 3.63 | 2.65 | 4.1 | 2.5 | 3.63 |
| Surface smoothness. PPS 1.0 MPa. μm. BS | 7.58 | 4.58 | 2.2 | 6.24 | 2.2 | 4.58 |
| Roughness Bendtsen. ml/min. TS | 455 | 39 | 21 | 121 | 28 | 39 |
| Roughness Bendtsen. ml/min. BS | 936 | 68 | 13 | 322 | 22 | 68 |
| Cobb 60. g/m² TS | 19 | 20.9 | 23.7 | 18.6 | 20.2 | 20.9 |
| Air resistance Gurley. s. TS | 30790 | 39530 | 42300 | 42300 | 42300 | 39530 |
| Air resistance Gurley. s. BS | 36500 | 39870 | 42130 | | | 39870 |
| OTR 23 C. 50% RH | 2000 | 2000 | 2000 | 3.4 | 4.4 | 2000 |
| WVTR 23 C. 50% RH | 220 | 180 | 140 | 95 | 130 | 180 |
| Moisture content at 50% RH. % | 6.61 | 6.89 | 6.56 | 6.44 | 6.75 | 6.89 |
| Precoated sheet | | | | | | |
| Coat weight (g/m2) | 6 | 4 | 5 | 4 | 4 | 4 |
| Coating passages | 2 | 2 | 3 | 3 | 3 | 2 |
| Surface smoothness when precoated. PPS 1.0 MPa. μm. | 6.6 | 3.73 | 2.11 | 4.89 | 2.22 | 3.89 |
| PVOH coated side | | | | | | |
| Air resistance Gurley. s. PVOH coated side | max | max | max | max | max | max |
| OTR 23 C. 50% RH (min) | 1037 (2000) | 309 (604) | 1.2 (1.6) | 0.8 (1) | 0.8 (0.8) | 1 (6) |

TABLE 2a

| TP # | 1 (Ref) | 2 (Ref) | 3 (Ref) | 4 (Ref) | 5 (Ref) |
|---|---|---|---|---|---|
| Std metallized OD 3.5 | | | | | |
| OTR 23 C. 50% RH (min) | 2000 (2000) | 20.4 (1340) | | 37.8 (987) | 0.8 (1.4) |
| WVTR 23 C. 50% RH (min) | 5.1 (5.8) | | | 0.17 (0.2) | 5.3 (8.4) |
| Std metallized OD 2.5 | | | | | |
| OTR 23 C. 50% RH (min) | | | | | |
| WVTR 23 C. 50% RH (min) | | | | | |

TABLE 2b

| TP # | 6 (ref) | 7 | 8 | 9 | 10 | 11 (ref) |
|---|---|---|---|---|---|---|
| Std metallized OD 3.5 | | | | | | |
| OTR 23 C. 50% RH (min) | 18.8 (1100) | 25.6 (78) | 12.4 (30.4) | 2.6 (2.6) | 1.4 (1.4) | 126 (289) |
| WVTR 23 C. 50% RH (min) | | 1.4 (2.4) | | | 0.21 (0.23) | 1.1 (1.2) |
| Std metallized OD 2.5 | | | | | | |
| OTR 23 C. 50% RH (min) | | | | | 0.4 (0.6) | 40.4 (40.8) |
| WVTR 23 C. 50% RH (min) | | | | | 0.042 (0.042) | 0.7 (0.71) |

In view of the above detailed description of the present invention, other modifications and variations will become apparent to those skilled in the art. However, it should be apparent that such other modifications and variations may be effected without departing from the spirit and scope of the invention.

The invention claimed is:

1. A method for manufacturing a barrier film, comprising the steps of:

providing an aqueous suspension comprising at least 70 weight-% highly refined cellulose pulp based on a total dry weight of the aqueous suspension, wherein said highly refined cellulose pulp has a Schopper-Riegler value of 70-95° SR, and wherein said highly refined cellulose pulp has a content of fibers having a length>0.2 mm of at least 12 million fibers per gram based on a dry weight;

forming a wet web from said aqueous suspension;

dewatering, or drying, or dewatering and drying said wet web to form a substrate having a first side and an opposite second side;

calendering said substrate in at least a first calender nip in a first calendering step and a second calender nip in a second calendering step, wherein said substrate has a moisture content of 1-25 weight-% when entering said first calender nip;

providing said substrate with at least one layer of:

a) a water-based solution or dispersion comprising a polymer selected from a group consisting of: a polyvinyl alcohol, a modified polyvinyl alcohol, a polysaccharide, a modified polysaccharide, and combinations thereof, on said first side in a coating step to form a coated substrate, wherein each layer on said first side has a coat weight of 0.5-3 gsm, calculated as a dry weight, and wherein a total coat weight on the first side is equal to or less than 6 gsm calculated as a dry weight, and drying said coated substrate after said calendering and said coating step so as to form said barrier film, wherein said barrier film has a thickness of less than 50 μm.

2. The method according to claim 1, wherein said calendering is performed before said coating step.

3. The method according to claim 1, wherein said coating step is performed before said calendering.

4. The method according to claim 1, wherein said first calender nip and said second calender nip are respectively constituted by a calender nip selected from a group consisting of: a soft calender nip, a hard calender nip, a super calender nip, a belt calender nip, and a nip in a multi-nip calender.

5. The method according to claim 2, further comprising an additional calendering step after said coating step, wherein said additional calendering step comprises calendering said coated substrate in at least one further calender nip selected from a group consisting of: a soft calender nip, a hard calender nip, a super calender nip, and a belt calender nip.

6. The method according to claim 1, wherein a Gurley Hill porosity value of the substrate obtained in said step of dewatering, or drying, or dewatering and drying said wet web is at least 25000 s/100 ml.

7. The method according to claim 1, wherein said substrate is provided with at least one layer of a water-based solution or dispersion comprising polyvinyl alcohol in the coating step.

8. The method according to claim 1, wherein said method further comprises providing said substrate with at least one layer of said water-based solution or dispersion on said second side in a second coating step, wherein each layer on said second side has a coat weight of 0.5-5 gsm, calculated as a dry weight, wherein the total coat weight of said at least one layer on said first side is equal to or less than 5 gsm calculated based on dry weight, and wherein a total coat weight of said at least one layer on said second side is equal to or less than 5 gsm calculated as a dry weight, and wherein said drying of said coated substrate is performed after said second coating step.

9. The method according to claim 8, wherein said substrate is provided with at least one layer on said section side of a water-based solution or dispersion comprising polyvinyl alcohol in the second coating step.

10. The method according to claim 8, wherein said coating step and said second coating step are performed simultaneously.

11. The method according to claim 1, wherein said substrate obtained in said step of dewatering, or drying, or dewatering and drying said wet web has a density of 600-950 kg/m³.

12. The method according to claim 1, wherein a basis weight of said substrate obtained in the step of dewatering, or drying, or dewatering and drying is less than 90 g/m².

13. The method according to claim 1, further comprising a step of pre-moisturizing said substrate prior to said calendaring.

14. The method according to claim 1, wherein said calendering comprises using a line load of up to 500 kN/m.

15. The method according to claim 1, wherein said calendering comprises using a temperature of 50-250° C.

16. The method according to claim 1, wherein said highly refined cellulose pulp has a length weighted mean fibril area of fibers having a length>0.2 mm of at least 15%.

17. The method according to claim 1, wherein the wet web is a single or multilayer web made with one or several headboxes.

18. The method of claim 1 further comprising:

applying a vacuum coating layer having a thickness in a range of 0.1-500 nm on at least said first side of said barrier film to form a barrier film laminate.

19. The method of claim 18 further comprising:

laminating said barrier film laminate with a paper or paperboard base material to produce a paper or paperboard based packaging material laminate.

20. A barrier film comprising a coated substrate, wherein said substrate comprises at least 70 weight-% highly refined cellulose pulp, wherein said highly refined cellulose pulp has a Schopper-Riegler value of 70-95° SR, and wherein said highly refined cellulose pulp has a content of fibers having a length>0.2 mm of at least 12 million fibers per gram based on a dry weight;

wherein said substrate has a first side and a second, opposite side;

wherein said substrate is provided with at least one layer comprising:

b) a polymer selected from a group consisting of: a polyvinyl alcohol, a modified polyvinyl alcohol, a polysaccharide, a modified polysaccharide, and combinations thereof, on said first side, wherein each layer has a coat weight of 0.5-3 gsm, calculated as a dry weight, and wherein a total coat weight on the first side is equal to or less than 6 gsm calculated as a dry weight;

wherein the barrier film has a thickness of less than 50 μm, wherein a tensile strength index of the barrier film in the machine direction is >60 Nm/g and a tensile strength index of the barrier film in the cross-machine direction is >30 Nm/g, and wherein a tensile stiffness index of the barrier film in the machine direction is >9 kNm/g and a tensile stiffness index of the barrier film in the cross-machine direction is >3.5 kNm/g.

21. The barrier film of claim 20, further comprising:

a vacuum coating layer having a thickness in a range of 0.1-500 nm.

22. The barrier film according to claim 21, wherein the barrier film has a water vapor transmission rate of less than 20 g/m²/day.

* * * * *